(12) United States Patent
Cornelissen et al.

(10) Patent No.: US 12,418,342 B2
(45) Date of Patent: Sep. 16, 2025

(54) OPTICAL DETECTOR

(71) Applicant: SIGNIFY HOLDING B.V., Eindhoven (NL)

(72) Inventors: Hugo Johan Cornelissen, Escharen (NL); Christoph Gerard August Hoelen, Valkenswaard (NL); Johan Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/286,784

(22) PCT Filed: Apr. 11, 2022

(86) PCT No.: PCT/EP2022/059617
§ 371 (c)(1),
(2) Date: Oct. 13, 2023

(87) PCT Pub. No.: WO2022/218918
PCT Pub. Date: Oct. 20, 2022

(65) Prior Publication Data
US 2024/0137120 A1   Apr. 25, 2024

(30) Foreign Application Priority Data
Apr. 13, 2021  (EP) .................................. 21167993

(51) Int. Cl.
*H04B 10/11* (2013.01)
*G02B 6/26* (2006.01)

(52) U.S. Cl.
CPC ............. *H04B 10/11* (2013.01); *G02B 6/262* (2013.01)

(58) Field of Classification Search
CPC ................................ H04B 10/11; G02B 6/262
See application file for complete search history.

(56) References Cited

U.S. PATENT DOCUMENTS 4,914,284 A * 4/1990 Halldorsson ........... G02B 6/241
356/141.5
6,624,916 B1  9/2003 Green et al.
(Continued)

FOREIGN PATENT DOCUMENTS

EP           1162770 A2   12/2001
WO   WO-2020039086 A1 *  2/2020 ............... G01B 1/00
WO        2020102579 A1    5/2020

*Primary Examiner* — Georgia Y Epps
*Assistant Examiner* — Don J Williams

(57) ABSTRACT

The invention concerns an optical detector (100) with a low-cost and efficient solution for the imaging lens in the receiver that is configured to better receive optical signals originating from wide viewing angles. The optical detector (100) comprises a ball lens (101), a photodetector (120), and a plurality of lightguides (103). The ball lens (101) comprising a first spherical surface (010) for receiving incoming light and a second spherical surface (020) for exiting incoming light. Each of the plurality of lightguides (103) has a light entry surface (104) and a light exit surface (105). The plurality of light entry surfaces (104) are facing the second spherical surface (020) of the ball lens (101) and the plurality of light exit surfaces (105) are facing the photodetector (120). The photodetector (120) and the plurality of lightguides (103) are arranged around an optical axis (001) of the ball lens (101).

12 Claims, 16 Drawing Sheets

(56) References Cited

U.S. PATENT DOCUMENTS

| | | |
|---|---|---|
| 7,079,774 B2 | 7/2006 | Sidorovich et al. |
| 2006/0127003 A1* | 6/2006 | Park ................ G11B 7/1387 |
| | | 385/33 |
| 2015/0370011 A1 | 12/2015 | Ishihara |
| 2015/0370012 A1 | 12/2015 | Ishihara |
| 2016/0170218 A1* | 6/2016 | Johnson ............ G02B 6/3863 |
| | | 359/356 |
| 2016/0308622 A1 | 10/2016 | Pfnuer et al. |
| 2018/0113247 A1* | 4/2018 | Rose .................. G02B 6/262 |
| 2018/0269971 A1 | 9/2018 | Tang et al. |
| 2019/0316967 A1* | 10/2019 | Schieferdecker ..... G01J 5/0853 |

* cited by examiner (a)  (b)

OPTICAL DETECTOR

CROSS-REFERENCE TO PRIOR APPLICATIONS

This application is the U.S. National Phase application under 35 U.S.C. § 371 of International Application No. PCT/EP2022/059617, filed on Apr. 11, 2022, which claims the benefit of European Patent application Ser. No. 21/167, 993.1, filed on Apr. 13, 2021. These applications are hereby incorporated by reference herein.

FIELD OF THE INVENTION

The invention concerns an optical detector with a low-cost and efficient solution for the imaging lens in the receiver that is configured to better receive optical signals originating from wide viewing angles. The optical detector may be suitable but not limited to optical wireless communication.

BACKGROUND OF THE INVENTION

In recent years, optical wireless communication has seen rapid growth in terms of research and commercial activities. High speed, high bandwidth, immunity to electromagnetic interference, and security are attractive features that are driving these activities. Briefly, this is an area of communication in which modulated visible, infrared, or ultraviolet modulated light is used to transmit communication signals in the form of optical signals. This component is configured to transmit optical signals in a wide beam and this is often referred to as the access point, that is connected to the information network. In a generic scenario, multiple access points are set up on the ceiling to cover the area of interest as much as possible. Each of the access points comprising emitters may be incorporated in a ceiling luminaire. At the receiving side, there is an optical device comprising at least a photodetector that is arranged to receive these transmitted optical signals and establish at least one communication link with one of these access points. The receiving side may also comprise an emitter configured to emit a wide beam of the optical signal that in turn is received by one or more photodetectors in the access point in the ceiling. The receiving side is often referred to as the endpoint. Both the access point and the endpoint are essentially optical wireless communication devices that at least accommodate components such as emitter, photodetector, and necessary communication circuitry.

EP1162770A2 relates to an optical communication system comprising a plurality of remote subscriber receivers and an optical base terminal, the optical base terminal comprising a transmitter implemented as a plurality of base terminal optical radiation sources positioned on a curved surface and a single wide-angle objective lens located between the radiation sources and paths to the remote subscriber receivers.

US20150370012A1 relates to an imaging apparatus includes an imaging optical system, an imaging element, and an optical fiber bundle composed of a plurality of optical fibers configured to guide light from the imaging optical system to the imaging element.

US20150370011A1 relates to an image pickup apparatus includes an imaging optical system; an image pickup device; and an optical fiber bundle constituted by plural optical fibers configured to guide light from the imaging optical system to the image pickup device.

U.S. Pat. No. 7,079,774B2 relates to a free-space optical communication system serves transmit/receive subscriber terminals, and each subscriber terminal includes a photodetector and one or more sources of modulated radiation.

SUMMARY OF THE INVENTION

In a high-bandwidth and high-speed optical wireless communication system, narrow beams of light emitted from access points may be used and establish a connection to endpoints such as mobile receivers. In the receiver, the light beam is focused with a lens onto an array of photodetector segments, and the photodetector segment with optimum signal strength is selected for the connection. To guarantee a high-bandwidth and high-speed connection, the photodetector segment must be small, and the image quality and throughput of the lens must be high. Lenses with such qualities may bring prohibitively high costs. Wherein cheaper lenses may suffer from relatively low throughput and throughput that depends on incidence angle.

It is an object of the present invention to provide an optical detector with a low-cost and efficient solution for the imaging lens in the receiver. The solution can be a ball lens or ball lens array, which brings substantially lower costs combined with a higher throughput that is independent of the incidence angle of incoming light. In this invention, the use of a ball lens with an optical detector is described that can benefit from the curved or spherical focal plane of the ball lens.

According to a first aspect, this and other objects are achieved by an optical detector comprising a ball lens, a photodetector, and a plurality of lightguides. The ball lens comprises a first spherical surface for receiving incoming light and a second spherical surface for exiting incoming light. Each of the plurality of lightguides has a light entry surface and a light exit surface. The plurality of light entry surfaces are facing the second spherical surface of the ball lens and the plurality of light exit surfaces are facing the photodetector. The photodetector and the plurality of lightguides are arranged around an optical axis of the ball lens. The plurality of light entry surfaces arranged together provides a flat surface that is perpendicular to a center plane, with the center plane is coinciding with the optical axis of the ball lens, and each of the plurality of light entry surface at least partially coincides with a focal plane of the ball lens.

In the context of the present invention, a ball lens is an optical element having a substantially spherical light impinging surface and a substantially spherical light transmitting surface. According to this invention, the spherical light impinging surface is referred to as the first spherical surface and the spherical light transmitting surface is referred to as the second spherical surface. The first spherical surface and the second spherical surface may be part of the same sphere. Hence, the ball lens may have an intermediate surface that is a continuous surface between the first spherical surface and the second spherical surface. Alternatively, the first spherical surface and the second spherical surface may be part of different spheres. Therefore, the intermediate surface between the first spherical surface and the second spherical surface may not be continuous or smooth. The intermediate surface may have a circular or a polygonal circumference.

The optical axis of the ball lens may be conveniently used as a reference to define angles of incidence for incoming light beams impinging on the first spherical surface of the ball lens.

A suitable example of the plurality of the photodetector segment can be an array of PiN photodiodes. In the case of a relatively large PiN photodiode with a diameter in the range from 0.1-1 mm, a significant bandwidth increase can be realized compared to the typically used 25 square millimeters for the Si photodetector element. The inactive space between the photodetector segments may be relatively small, and the concentration of the light may not be needed to prevent significant light loss. High bandwidth can be also achieved with avalanche photodiodes (APDs) that typically have a diameter in the order of 0.1-0.5 mm. Although smaller, as well as larger sizes for APDs, may be possible as well. These can be manufactured in arrays and in the same way as above described for PiN photodiodes, arrays of APD segments can be realized. For some applications, APDs may be preferred since they have built-in amplification, and the signals from multiple segments can be easily combined without concerns about adding additional noise due to the additional electronic circuitry required for the connections and combination of the signals.

In the context of the present invention, a lightguide refers to an optical medium that allows transmission of light by means of total internal reflection. The lightguides may be based on optical fibers having core and cladding. Alternatively, the lightguides may have hollow cores with reflective inner surfaces.

The photodetector and the plurality of lightguides may be symmetrically arranged around the optical axis of the ball lens.

The symmetry can be assumed to be rotationally symmetric around the optical axis.

The plurality of lightguides may have a circular or a polygonal cross-section and the plurality of lightguides may be arranged in a lightguide array.

The plurality of lightguides may be collectively arranged or bundled next to each other. The cross-sections of the plurality of lightguides may be applicable for the plurality of light entry surfaces and/or the plurality of light exit surfaces. The plurality of lightguide can be a simple set of lightguides mounted on a photodetector or an array of photodetector segments that have decreasing lengths from the edge of the photodetector or the array of photodetector segments towards the center axis of the ball. The light entry surfaces of the lightguides are close to the focal plane of the ball lens so that the light transmitted by the ball lens can be coupled into the lightguide. A specific implementation for the plurality of lightguides in a bundle can be found in the application of an imaging optical fiber bundle that may be processed as a monolithic building block and that can easily be mounted in the system, at the cost of some light loss due to the required claddings around the cores of the individual fibers.

The photodetector may comprise a plurality of photodetector segments.

The plurality of lightguides may have a number of lightguides and the plurality of photodetector segments may have a number of photodetector segments that is the same as the number of lightguides.

Individual lightguide may be in optical connection with an individual photodetector segment. It is possible that one lightguide may be associated with multiple photodetectors.

The plurality of light entry surfaces may be arranged together provides a spherical surface that is at least partially coinciding with a focal plane of the ball lens.

Incoming light beams originating with various angles of incidences will be focused by the ball lens on a focal plane that has a spherical shape. The plurality of light entry surfaces arranged together providing a spherical surface may accommodate the field curvature of the ball lens. Therefore, images of the incoming light beam with various angles of incidences may be formed above, below, or on the plurality of light entry surfaces and coupled into the plurality of lightguides. Which is subsequently propagated towards the plurality of photodetector segments. The spherical surface curvature may at least partially follow the focal plane curvature. The offset between the spherical plane and the focal plane can be within a margin (±) of 0.3 mm. So, the spherical plane may deviate from the focal plane by 0.3 mm. However, even higher deviation may be acceptable if the area of application is not too strict on the quality of the images produced by the ball lens.

Each of the plurality of light entry surfaces may be located on a transverse plane that is perpendicular to a center plane. The center plane may be coincident with the optical axis of the ball lens and each of the plurality of light entry surfaces at least partially coincides with the focal plane of the ball lens.

Each of the plurality of light entry surfaces may intersect, coincide, or at least be in close proximity of the focal plane. This is an alternative measure for accommodating the field curvature of the ball lens with discrete lightguides with flat light entry surface ends.

The plurality of light entry surfaces may be arranged together to provide a flat surface that is perpendicular to the center plane.

The flat surface may be arranged to intersect with the center plane at a first distance from an edge of the ball lens that intersects with the center plane. The first distance may be in a range between 50% to 80% of a back focal length of the ball lens.

The first distance may be in a range between 60% to 68% of the back focal length.

The first distance may be approximately 64.7% of the back focal length.

In the context of the present invention, the back focal length (BFL) of the simple ball lens is defined as the effective focal length (EFL) of the ball lens subtracted by the radius of the ball lens. The EFL is defined as the following equation:

$$BFL = EFL - \frac{D}{2} \ \& \ EFL = \frac{nD}{4(n-1)};$$

where, $D$ = diameter of the ball lens;

$n$ = refractive index;

With the above mentioned conditions for the flat surface, images produced from incoming light beams with angles of incidence at least between 0 to 25 degrees can be sharp with small spot size and with sufficient intensity contrast. Both of these criteria can be valuable for high-bandwidth optical wireless communication.

The optical detector may comprise an actuator configured to move the ball lens and/or the photodetector in a direction parallel to the optical axis.

The ball lens may be actuated with respect to the flat surface of the plurality of the lightguides or the photodetector plane. Alternatively, the photodetector, or the photodetector with the plurality of the lightguides may be actuated with respect to the ball lens.

The actuator is a mechanical device with a single axis actuation that can be exploited to compensate for the field curvature of the ball lens when the incoming light beam is originating from different angles of incidence. This actuated movement may help produce the sharpest image on the light entry surface of a lightguide for a given incidence angle. Only a small adjustment of the ball lens position in the vertical direction with respect to the photodetector plane can be sufficient to compensate for the field plane curvature. For example, if a ball lens having a radius of 3.4 mm and the difference in the focus plane between angles of incidence of 0° and 25° is about 0.75 mm.

The plurality of photodetector segments may be arranged in a photodetector plane that is perpendicular to the center plane.

Photodetector arrays with multiple segments may be available with the detection surface laid on a substrate that is substantially flat.

The plurality of photodetector segments may be arranged in a curved plane.

The curved plane may be substantially parallel to the focal plane of the ball lens. Alternatively, the curved plane may have higher or lower curvature compared to the focal plane. The plurality of photodetector segments arranged on a flexible substrate, PCB, or foil may result in a curved plane.

Depending on the arrangement of the plurality of photodetector segments and the arrangement of the plurality of light entry surfaces of the plurality lightguides, one may assume the lightguide having a constant length or varying lengths with respect to its position on the photodetector and the center plane of the ball lens.

The optical detector may comprise a plurality of light concentrators between the plurality of photodetector segments and the plurality of lightguides and each of the plurality of light concentrators may be in optical connection with one of the plurality of photodetector segments and the plurality of lightguides.

In the absence of the light concentrator, the optical contact may apply to the light exit surface of the lightguide and the photodetector segment.

The light concentrator may allow the implementation of the photodetector segments with compact sizes that allow high-bandwidth communication. The lightguides may also taper towards the photodetector segments for allowing light concentration.

The optical connection may be a 'direct' contact between two optical entities, where the direct contact may be an optical adhesive that promotes light transmission between the two optical entities. The optical connection may also be an adhesion by means of weak Van der Waals interaction, or a direct interconnect realized by e.g. molding or casting. If the photodetector makes contact with the lens by means of a coupling material, it may be beneficial to have a coupling material with a refractive index between that of the photodetector and the lens and preferably the refractive index of the lens.

The optical connection may also be an 'indirect' contact between two optical entities. For example, air may be considered as a coupling medium between the lightguide and the photodetector segment. However, more Fresnel reflection at the interface of the light exit surface of the lightguide and the photodetector segment may lead to more losses of light. So, a medium with a refractive index higher than air is preferred. Otherwise, the photodetector and the light exit surface of the lightguide may have anti-reflection coatings to minimize the loss of light.

According to a second aspect, an optical communication device is provided comprising the optical detector and a digital communication interface device. The optical detector may be communicatively connected to the digital communication interface device.

The optical wireless communication device may be part of a mobile endpoint device. In that case, data transfer from the optical wireless communication device (e.g. dongle or mobile phone) may be accomplished through a digital communication interface device. The optical wireless communication device may be communicatively connected to the digital communication interface device by means of a wire, or copper or gold interconnect. The digital communication interface device can be a Universal Serial Bus (USB) interface, a Bluetooth interface, or an Ethernet interface. The mobile optical communication device may be communicatively connected to a user device via the digital communication interface device.

It is noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

The above, as well as additional objects, features, and advantages of the disclosed devices, methods, and systems, will be better understood through the following illustrative and non-limiting detailed description of embodiments of devices, methods, and systems, with reference to the appended drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
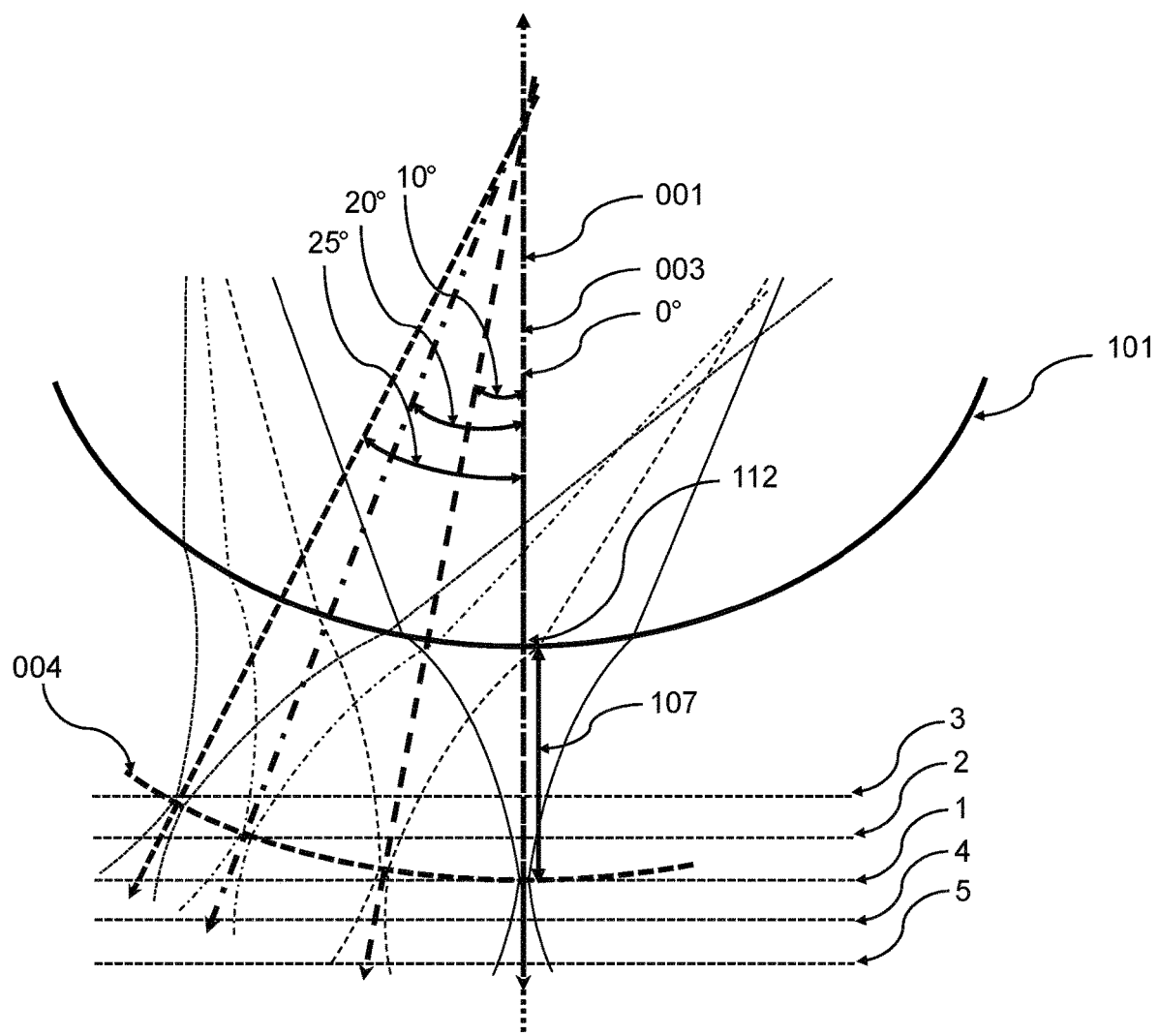
FIG. 1 shows a partial cross-section of a ball lens to understand image qualities for incoming lights with 0, 10, 20, and 25 degrees angles of incidence.

Referring initially to FIG. 1, a partial cross-section of a ball lens 101 is shown. The ball lens 101 comprises an optical axis 001 and a center plane 003 that lies on the optical axis 001. The focal plane 004 of the ball lens 101 having a characteristic spherical curvature is shown in FIG. 1. A first fictitious plane 1 is shown perpendicularly intersecting the center plane 003 where the focal plane 004 intersects the center plane 003. Four other fictitious planes 2, 3, 4, and 5 are shown in FIG. 1 that are parallel to the fictitious plane 1. One may assume that a flat photodetector or a plurality of flat photodetector segments present on any of these five fictitious planes 1, 2, 3, 4, and 5, or in between these five fictitious planes 1, 2, 3, 4, and 5. The shortest distance between the fictitious plane 1 and the edge 112 of the ball lens 101 is known as the back focal length 107. If the ball lens has a radius of 3.4 mm and a refractive index of 1.5, then the back focal length is 1.7 mm.

Figure 2A:
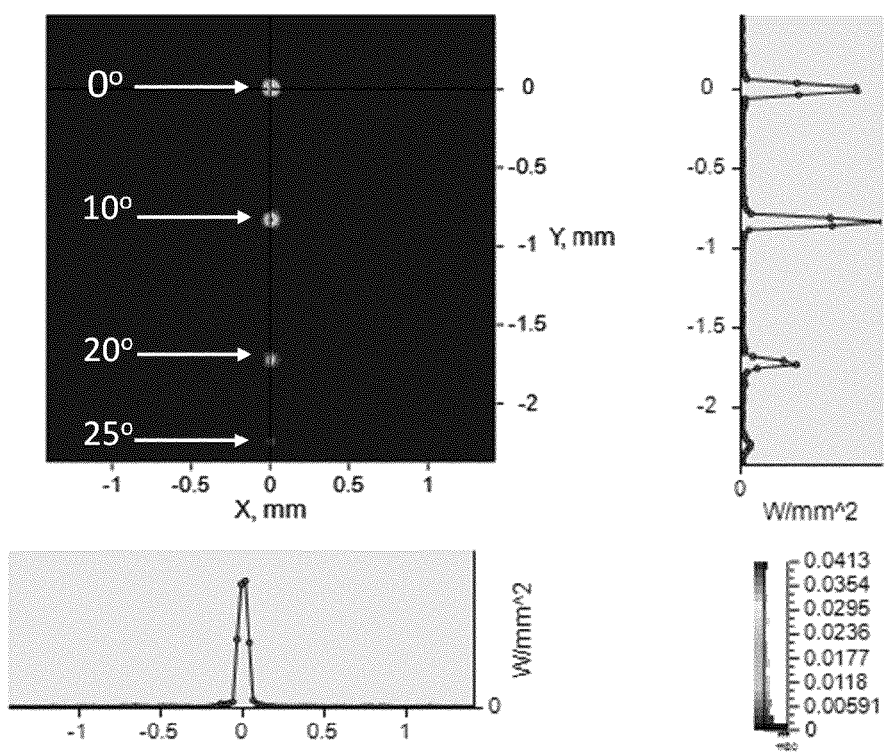
FIGS. 2(a)-(e) shows the image qualities for incoming lights with 0, 10, 20, and 25 degrees angles of incidence on different planes that are at different distances from a ball lens.

A narrow beam of light originating from a direction that is coincident with the optical axis 001 will be focused on the first fictitious plane 1, and a sharp image will be formed. In this case, the angle of incidence for the incoming light is 0 degrees. Incoming lights with 10, 20, and 25 degrees angles of incidence will focus on the focal plane 004 but not optimally on the first fictitious plane 1. This is shown in FIG. 2(a). FIG. 2 shows image qualities for incoming lights with 0, 10, 20, and 25 degrees angles of incidence on the fictitious planes 1, 2, 3, 4, and 5. Incoming lights with angles of incidence of 0 and 10 degrees are imaged sharply with small spot size and sufficient intensity. However, poor image quality is seen for higher angles of incidence. Incoming light with an angle of incidence of 25 degrees is barely imaged on the first fictitious plane 1. According to FIG. 1, the first fictitious plane 1 is separated from the edge 112 of the ball lens 101 by a distance equal to the back focal length 107 of the ball lens 101. If the ball lens has a radius of 3.4 mm and a refractive index of 1.5, then the back focal length 107 is 1.7 mm.

Figure 2B:
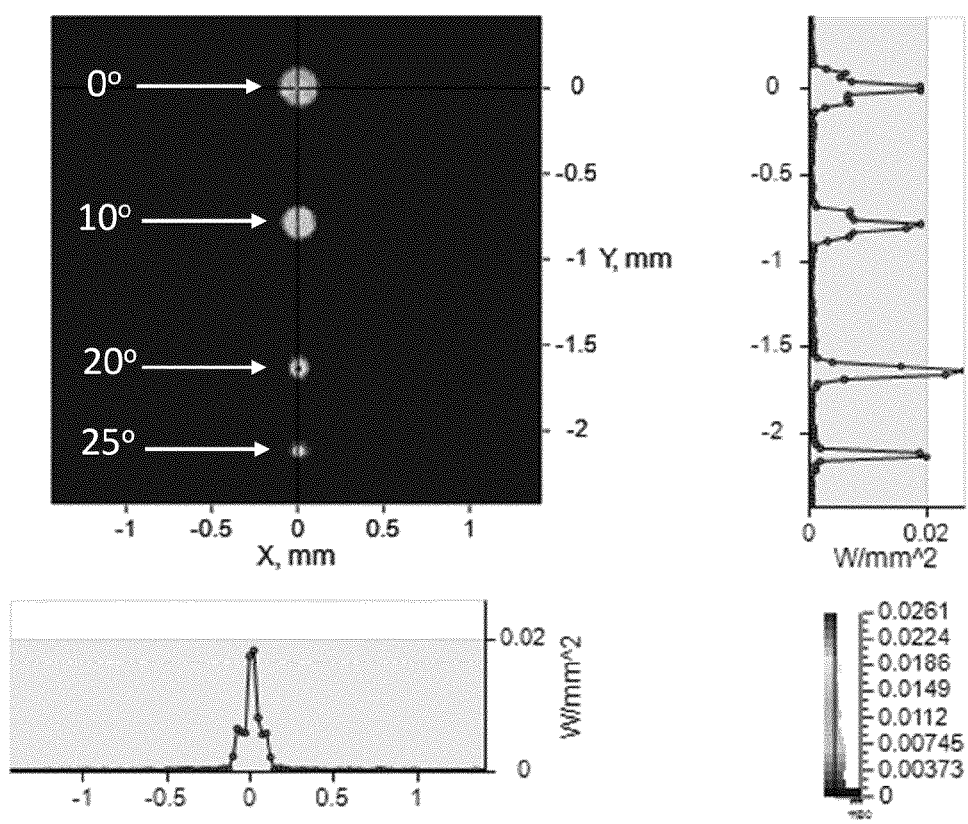

In FIG. 2(b), image qualities for incoming lights with 0, 10, 20, and 25 degrees angles of incidence are shown for the second fictitious plane 2 that is relatively closer to the ball lens 101 than the first fictitious plane 1. In this case, the spot sizes for the images formed for the incoming lights with angles of incidence of 0 and 10 degrees are relatively larger compared to FIG. 2(a). According to FIG. 1, the separation between the first fictitious plane 1 and the second fictitious plane 2 is 0.6 mm. That means these two images are relatively out of focus. On the other hand, the images formed for the incoming lights with angles of incidence of 20 and 25 degrees are relatively smaller compared to FIG. 2(a). In fact, the smallest image spot size is seen for the incoming light with an angle of incidence of 25 degrees. While the image spot sizes are different for different angles of incidence, the intensities of the four images are quite comparable and may be sufficient for establishing optical communication links.

Figure 2C:
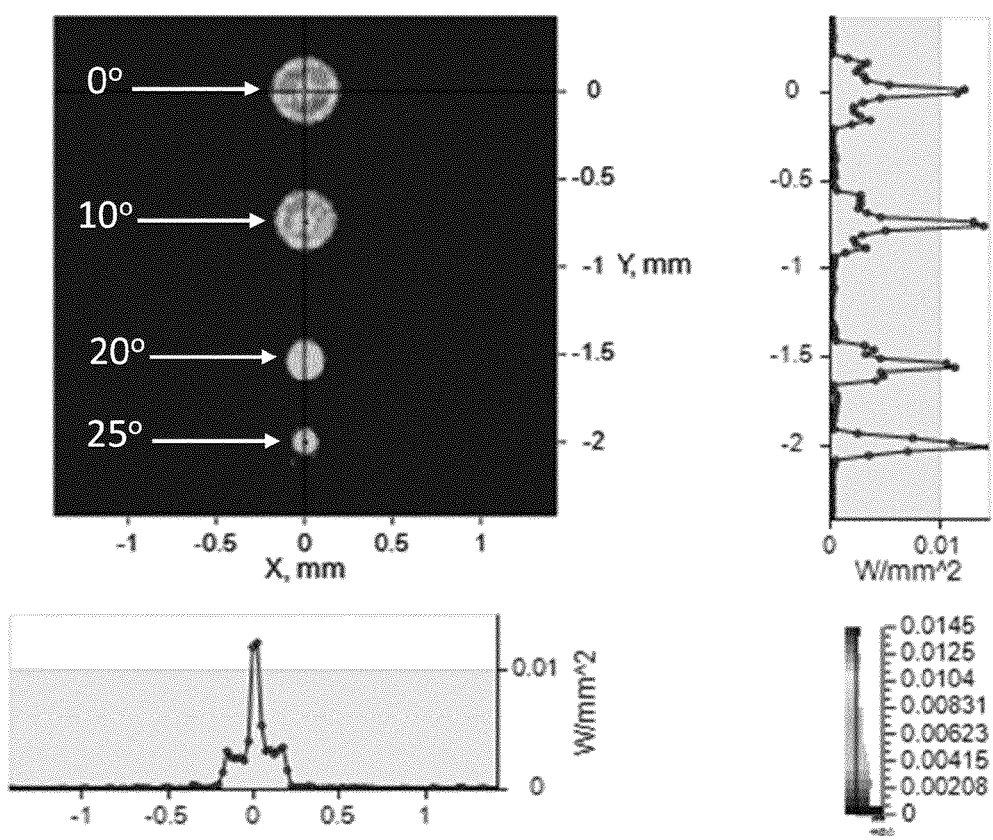

In FIG. 2(c), image qualities for incoming lights with 0, 10, 20, and 25 degrees angles of incidence are shown for the third fictitious plane 3 that is relatively closer to the ball lens 101 than the second fictitious plane 2. According to FIG. 1, the separation between the first fictitious plane 1 and the third fictitious plane 3 is 1.2 mm. In this case, the spot sizes for the images formed for the incoming lights with angles of incidence of 0, 10, 20, and 25 degrees are all much larger compared to FIG. 2(b). As a result, the intensities of the four images are quite small as well.

Figure 2D:
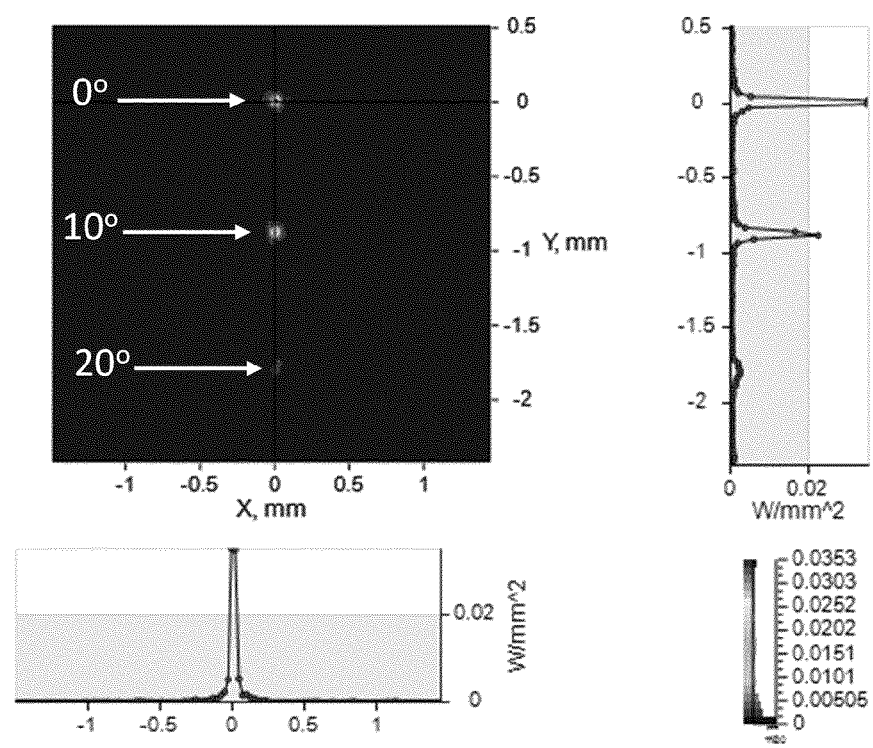

In FIG. 2(d), image qualities for incoming lights with 0, 10, 20, and 25 degrees angles of incidence are shown for the fourth fictitious plane 4 that is relatively further away from the ball lens 101 than the first fictitious plane 1. According to FIG. 1, the separation between the first fictitious plane 1 and the fourth fictitious plane 4 is 0.6 mm. In this case, no image is seen for the incoming light with an angle of incidence of 25 degrees. Also, the images formed for the angles of incidence of 0, and 10 degrees are not very sharp when compared to FIG. 2(a). The incoming light with an angle of incidence of 20 degrees is barely imaged on the fourth fictitious plane 4.

Figure 2E:
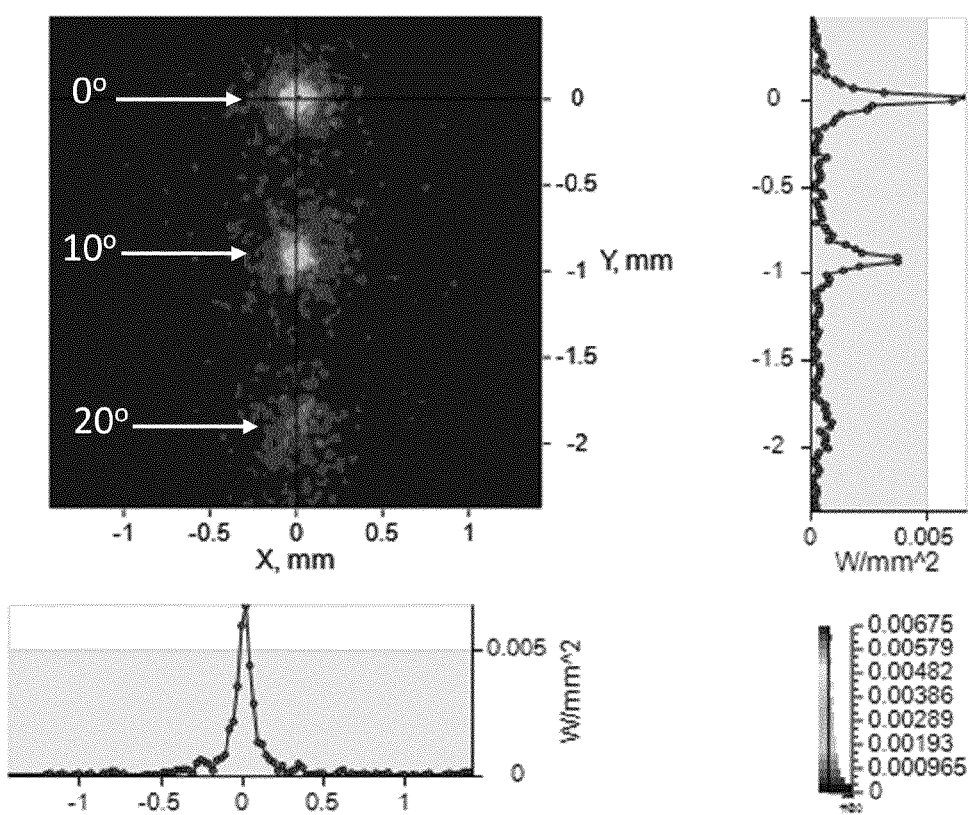

In FIG. 2(e), image qualities for incoming lights with 0, 10, 20, and 25 degrees angles of incidence are shown for the fifth fictitious plane 5 that is relatively further away from the ball lens 101 than the fourth fictitious plane 4. According to FIG. 1, the separation between the first fictitious plane 1 and the fifth fictitious plane 5 is 1.2 mm. Also, no image is seen for the incoming light with an angle of incidence of 25 degrees. The images formed for the angles of incidence of 0, 10, and 20 degrees are quite poor when compared to FIG. 2(a).

Therefore, if the fictitious plane is placed too close to the ball lens, the spot sizes for high angle of incidence incoming light beams are sufficiently small, but the spot sizes for small angle of incidence incoming light beams are too large. Vice versa, if the fictitious plane is placed too far from the ball lens, the spot sizes for small angle of incidence incoming light beams may be small, but the spot sizes for high angle of incidence incoming light beams are definitely out of focus. From FIG. 2, it can be understood that the second fictitious plane 2 can be considered an optimum position for a substantially flat photodetector or photodetector segments to optimally detect light for the angles of incidence at least in a range between 0 to 25 degrees. In this optimum position, the image sharpness is fairly good with a small image spot size for the angles of incidence at least in a range between 0 to 25 degrees, and also the intensities of the signals detected are fairly uniform and high. The distance between the second fictitious plane 2 from the edge 112 of the ball lens 101 that coincides with the center plane 003 can be suitable chosen in a range between 50% to 80% of the back focal length of the ball lens. Preferably, it is approximately 64.7% of the back focal length of the ball lens. Therefore, for a ball lens having a radius of 3.4 mm and a refractive index of 1.5, the optimum distance for a substantially flat photodetector or photodetector segments can be 1.1 mm.

One may consider the measure signal strength for optical signals coming from various angles of incidence to determine the optimum plane position from a ball lens. The signal strength may be proportional to the product of photodetector measured signal amplitude (peak height) and the square of the full width at half maximum (FWHM=area of beam spot size). So, the quantity to optimize would be FWHM*FWHM*peak height. This value should be substantially equal or close to a meeting certain threshold value for images of light beams of all angles of incidence. The threshold value may be dependent on the area of application. One may also restrict the FWHM to be smaller than a second threshold value The second threshold value may be related to the size of the receiver pixels for all angles of incidence.

Figure 3A:
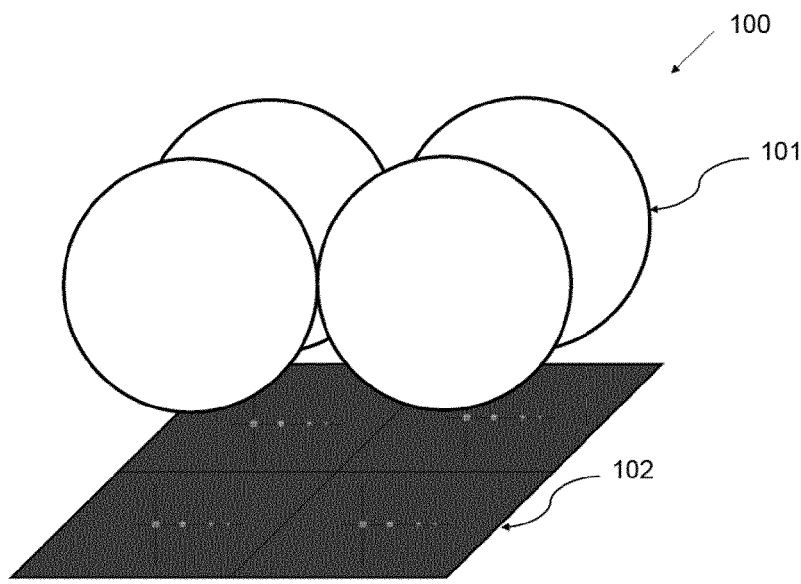
FIGS. 3(a) and (b) show an array of ball lenses and an array of photodetector segments for an optical detector and the image qualities for incoming lights with 0, 10, 20, and 25 degrees angles of incidence, respectively.
Figure 3B:
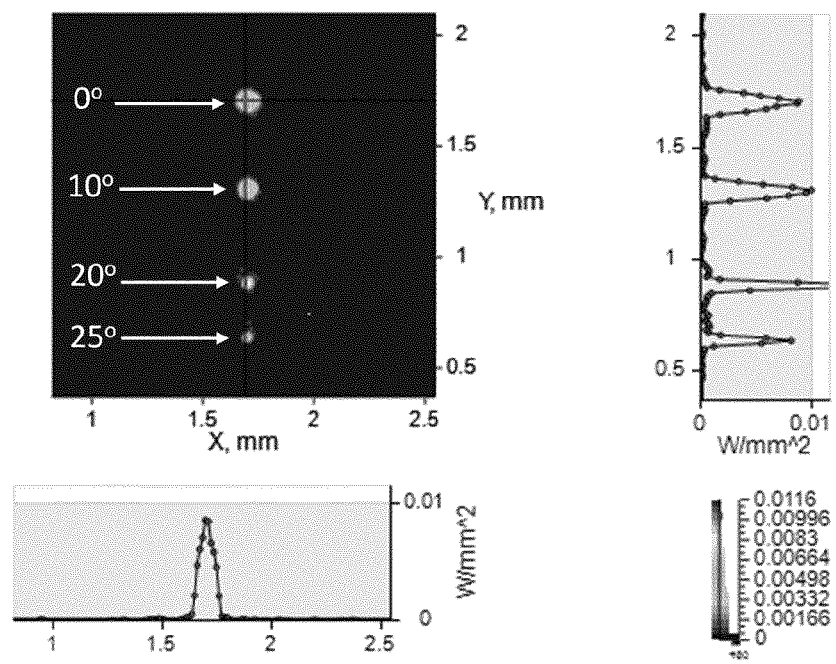

The images of the light beams from various angles of incidence on the photodetector plane may not be small enough due to this field curvature error. An improved configuration for an optical detector can be replacing the single ball lens with an array of ball lenses 101, e.g. a 2 by 2 array with a 2 by 2 photodetector 102 array as shown in FIG. 3(*a*). How a 2 by 2 ball lens array behaves optically is illustrated in FIG. 3(*b*). The images of the light beams with 0, 10, 20, and 25 degrees angles of incidence are now generating 2 by 2 images on the photodetector 102 array, one image in each quadrant of the photodetector array. The distance between the ball lens 101 array and the photodetector 102 array is chosen to be the optimum position as described above. Therefore, for a ball lens having a radius of 1.7 mm and a refractive index of 1.5, the optimum distance for the substantially flat photodetector or photodetector segments is 0.55 mm. The spot sizes are seen to be smaller and much more equal for the various incidence angles, as illustrated in FIG. 3(*b*). If a link with a certain transmitter needs to be established, the photodetector segment with maximum signal for the quadrant needs to be identified and its signal added to the three corresponding segments in the three other quadrants. This increases the signal strength by 4 times but the noise only by a factor of the square root of 4.

One may also scale up the ball lens array, for example, a 4 by 4 ball lens array with a 4 by 4 photodetector array. In that case, 16 images are created for each angle of incidence, and 16 photodetector segments are added for maximum signal strength and minimum noise.

Figure 4:
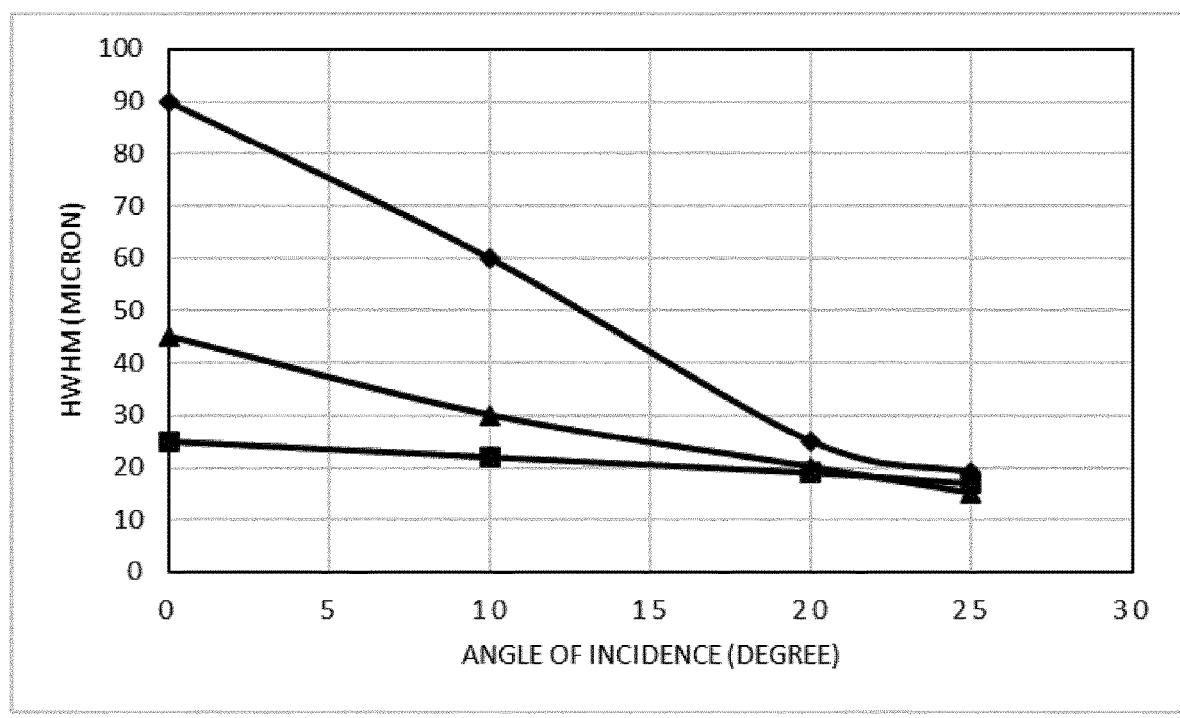
FIG. 4 shows the analysis of spot sizes of the various configurations with ball lens and ball lens arrays.

The analysis of spot sizes of the various configurations with ball lens (1 by 1) and ball lens arrays (2 by 2 and 4 by 4) are shown in FIG. 4. The half-width at half-maximum (HWHM) of the spot sizes of images of the light beams with 0, 10, 20, and 25 degrees angles of incidence are shown with respect to angles of incidence. For this analysis, the photodetector or photodetector segments are assumed to be placed in the optimum positions as discussed above. From FIG. 4, it appears that for the arrays the spot sizes are smaller and more equal for the various incidence angles than for the single ball lens.

Figure 5:
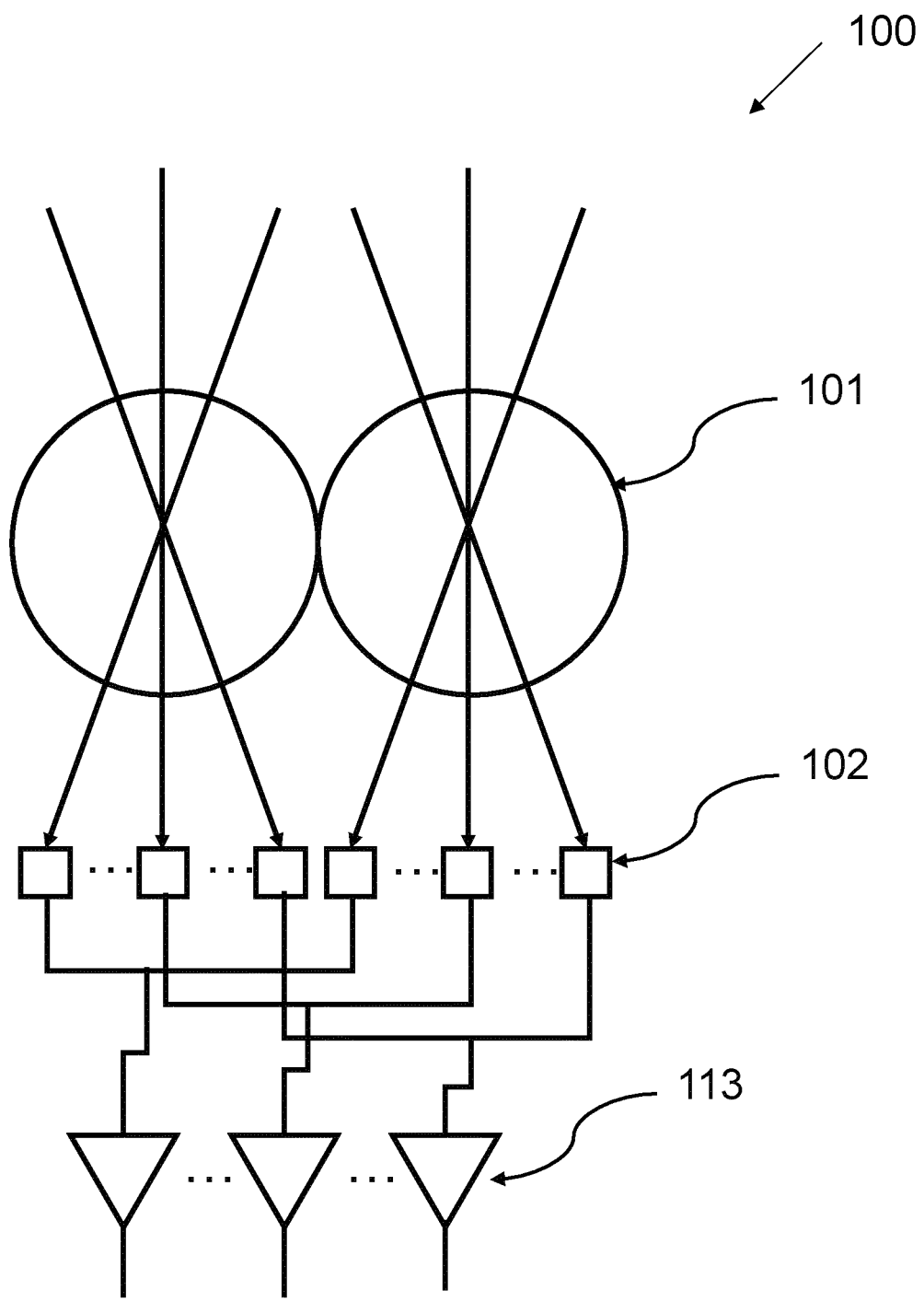
FIG. 5 shows a connection scheme for determining output with an array of ball lenses and an array of photodetector segments.

In FIG. 5, a connection scheme with the photodetector segments 102 for determining output is shown that is to be used with the ball lens 101 array. Each lens element 101, LEi (i.e., each small ball lens in the lens array) of an array of M lens elements (where 1<i≤M and M>1) is associated with an array of N photodetector 102 segments, SPi,k (where 1≤k≤N and N>1). The photodetector 102 segments SPi,k with equal index number k may all be connected to have their signals summed up, by which the number of output terminals 113 is reduced by a factor k and the output terminals 113 have N outputs that are purely associated with the angle of incidence of the incoming beam.

Figure 6:
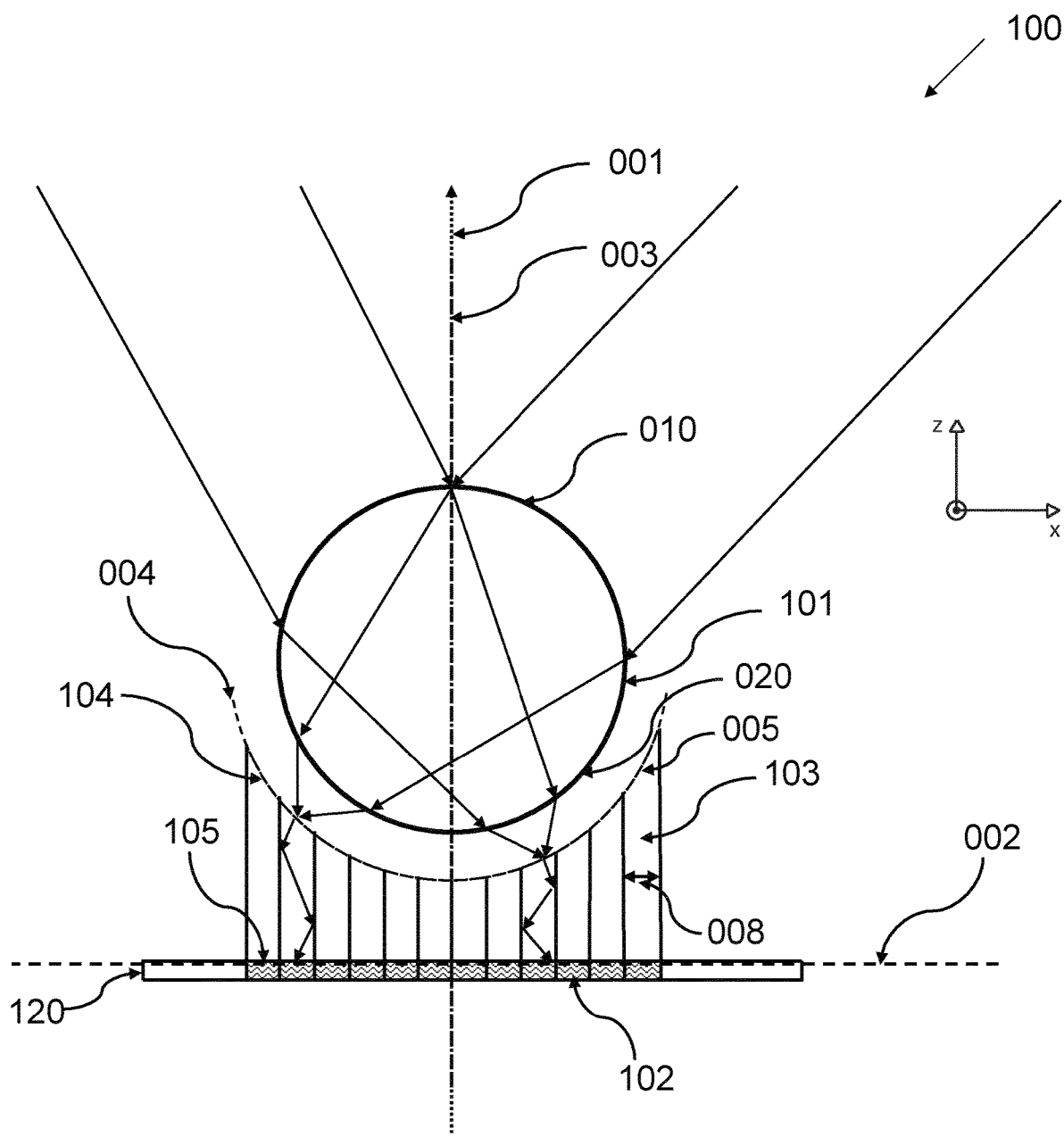
FIG. 6 shows a cross-sectional view of an optical detector comprising a ball lens, a plurality of photodetector segments, and a plurality of lightguides.

FIG. 6 shows a cross-sectional view of an optical detector 100 comprising a ball lens 101. The ball lens 101 comprises an optical axis 001 and a center plane 003 that lies in the optical axis 001. The ball lens 101 has a first spherical surface where incoming light beams are being received and the incoming light beams are then refracted out of the ball lens 101 through the second spherical surface 020. Incoming light beams originating with various angles of incidences will be focused by the ball lens 101 on a focal plane 004 that has a spherical shape as shown in FIG. 6. The optical detector 100 further comprises a photodetector 120 having a plurality of photodetector segments 102 in an array that are arranged on a photodetector plane 002 that is perpendicular to the center plane 003. Also, the optical detector 100 comprises a plurality of lightguides 103 in an array. The plurality of photodetector segments 102 and the plurality of lightguides 103 are symmetrically arranged around an optical axis 001 of the ball lens 101. The symmetry can be assumed to be rotationally symmetric around the optical axis 001. The cross-sectional view in FIG. 6 is shown in the x-z plane. Therefore, the cross-sectional view of the optical detector in the y-z plane will be the same as shown in FIG. 6. In FIG. 6, individual lightguide 103 is in optical connection with an individual photodetector segment 102. It is possible that one lightguide may be associated with multiple photodetectors.

Each of the plurality of lightguides 103 has a light entry surface 104 and a light exit surface 105. The plurality of light entry surfaces 104 are facing the second spherical surface 020 of the ball lens 101 and the plurality of light exit surfaces 105 are facing the photodetector 102. In FIG. 6, the plurality of photodetector segments 102 are in optical connection with the plurality of lightguides 103. The plurality of light exit surfaces 105 collectively forms a substantially flat as the photodetector plane 002. On the other hand, the plurality of light entry surfaces 104 collectively provides a spherical surface 005 that substantially coincides with the focal plane 004 of the ball lens 101. This way the plurality of light entry surfaces 104 can accommodate the field curvature of the ball lens 101. Therefore, images of the incoming light beam with various angles of incidences may be formed above, below, or on the plurality of light entry surfaces 104 and coupled into the plurality of lightguides 103. Which is subsequently propagated towards the plurality of photodetector segments 102.

The spherical surface 005 curvature may at least partially follow the focal plane 004 curvature. The offset between the spherical plane 005 and the focal plane 004 can be within a margin (±) of 0.3 mm. So, the spherical plane 005 may deviate from the focal plane 004 by 0.3 mm. However, even higher deviation may be acceptable if the area of application is not too strict on the quality of the images produced by the ball lens.

Figure 7:
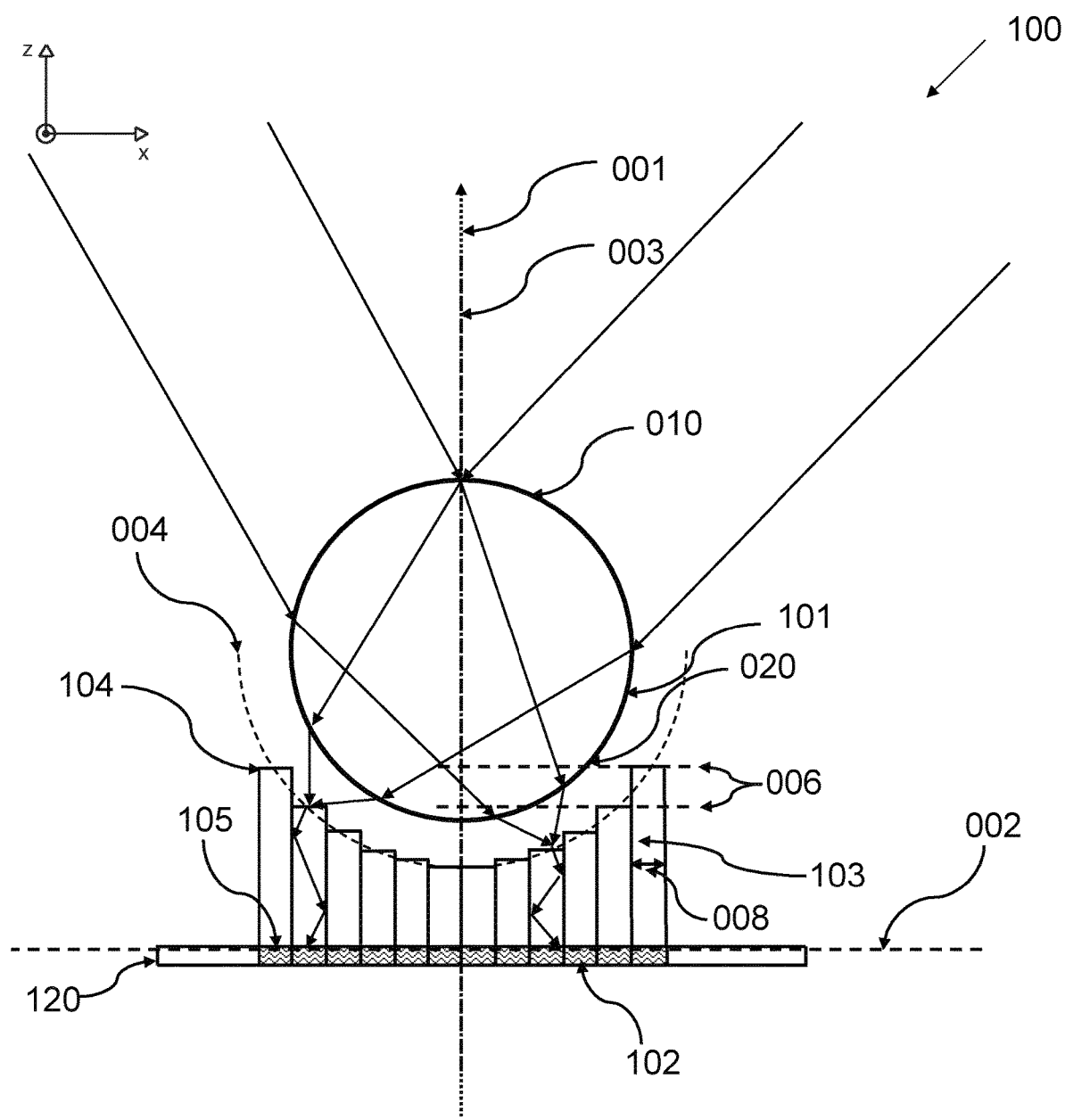
FIG. 7 shows a cross-sectional view of an optical detector comprising a different configuration for the plurality of lightguides.

FIG. 7 shows a cross-sectional view of an optical detector 100 comprising a different configuration for the plurality of lightguides 103. Similar to FIG. 6, the number of the plurality of photodetector segments being the same as the number of the plurality of lightguides. Each of the plurality of light entry surfaces 104 is located on a discrete transverse plane 006 that is perpendicular to a center plane 003 of the ball lens 101. And each of the plurality of light entry surfaces 104 at least partially coincides with the focal plane 004 of the ball lens 101. Therefore, each of the plurality of light entry surfaces 104 may intersect, coincide or at least be in close proximity of the focal plane 004. This is an alternative measure for accommodating the field curvature of the ball lens 101 with discrete lightguides 103 with flat light entry surface 104 ends. As a result, the cross-sectional view depicts a stepped distribution of lightguides 103 that has a decremental length towards the center plane 003.

Figure 8:
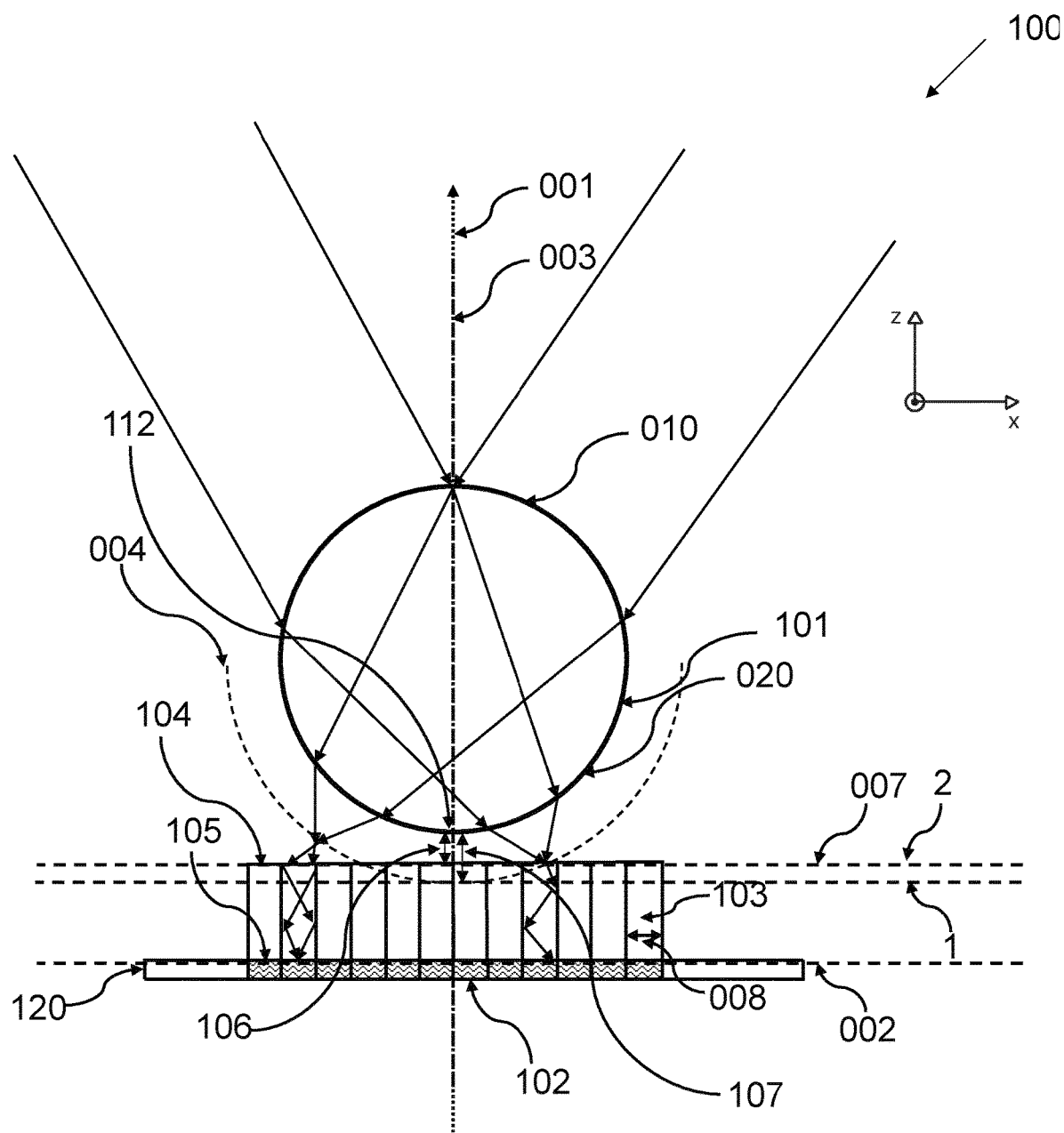
FIG. 8 shows a cross-sectional view of an optical detector comprising yet another configuration for the plurality of lightguides.

FIG. 8 shows a cross-sectional view of an optical detector 100 comprising yet another configuration for the plurality of lightguides 102. Contrary to the previous FIGS. 6 and 7, the plurality of light entry surfaces 104 arranged together provides a flat surface 007 that is perpendicular to the center plane 003. The flat surface 007 is also parallel to the photodetector plane 002. The flat surface 007 is arranged to intersect with the center plane 003 at a first distance 106 from an edge 112 of the ball lens 101 that coincides with the center plane 003. The shortest distance between the focal plane 1 and the edge 112 of the ball lens 101 is known as the back focal length 107. The first distance 106 may be in a range between 50% to 80% of a back focal length 107 of the ball lens 101. In contrast to FIG. 1 and FIG. 2 and related discussions, the flat surface 007 may be located between the fictitious plane 1 and fictitious plane 3. Preferably, the first distance can be in a range between 60% to 68% of the back focal length 107, more preferably approximately 64.7% of the back focal length 107. Therefore, the flat surface 007 may coincide with the fictitious plane 2 that is demonstrated to be the optimized distance for the imaging incoming light beams with angles of incidence at least between 0 to 25 degrees, as shown in FIG. 8.

Figure 9A:
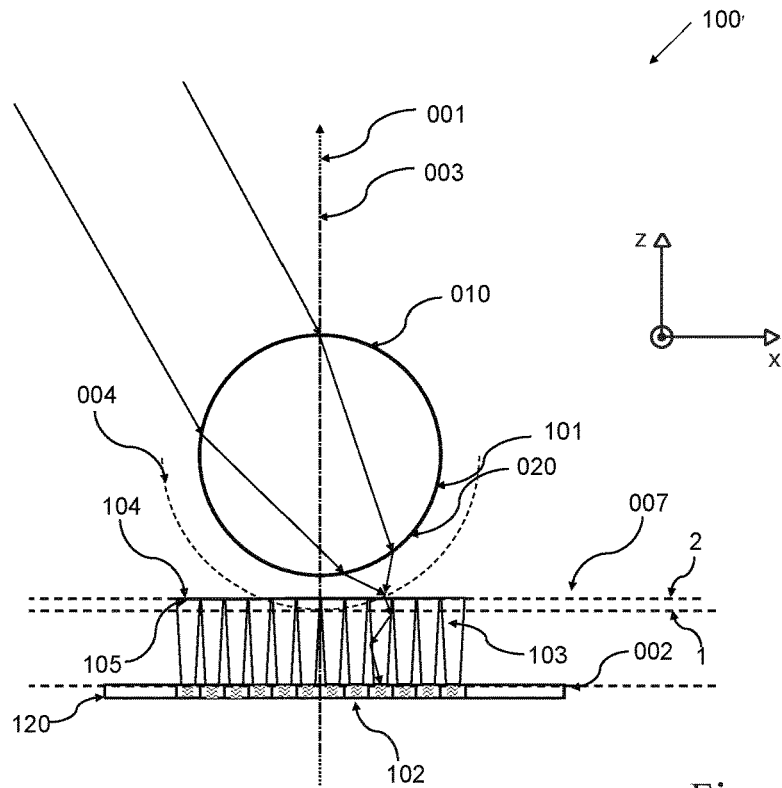
FIGS. 9(a) and (b) show an optical detector comprising tapering lightguides and light concentrators, respectively.
Figure 9B:
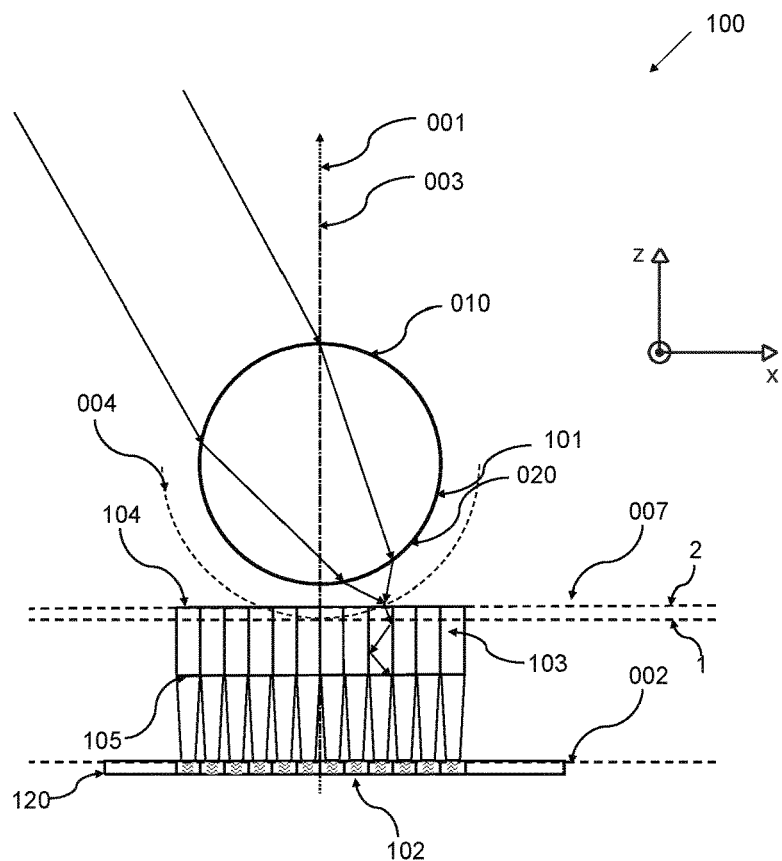

FIGS. 9(a) and (b) shows an optical detector 100 comprising a plurality of lightguides 103 tapering towards the plurality of photodetector segments 102 and a plurality of light concentrators 108 between the photodetector 102 and the plurality of lightguides 103, respectively. Similar to FIG. 8, the flat surface 007 of the plurality of light entry surfaces 104 coincides with the fictitious plane 2. As shown in FIG. 2, the spot sizes of the images formed by the ball lens for incoming light beams with angles of incidence at least between 0 to 25 degrees can vary in size. Therefore, the width 009 or the opening of the lightguide 103 may need to be sufficiently wide for collecting sufficient light. The width 009 of the lightguide 103 can be substantially the same as the detection surface area of a photodetector segment 102 as shown in FIGS. 6 to 8. For certain applications, it may be preferred to have the detection surface area may be smaller for allowing high bandwidth response. In this case, the lightguide 103 tapering towards the photodetector segment 102 allows concentration of light towards relatively small photodetector segment 102. Alternatively, a plurality of light concentrators 108 may be used between the plurality of photodetector segments 102 and the plurality of lightguides 103. Each of the plurality of light concentrators 108 are in optical connection with one of the plurality of photodetector segments 102 and the plurality of lightguides 103.

Figure 10:
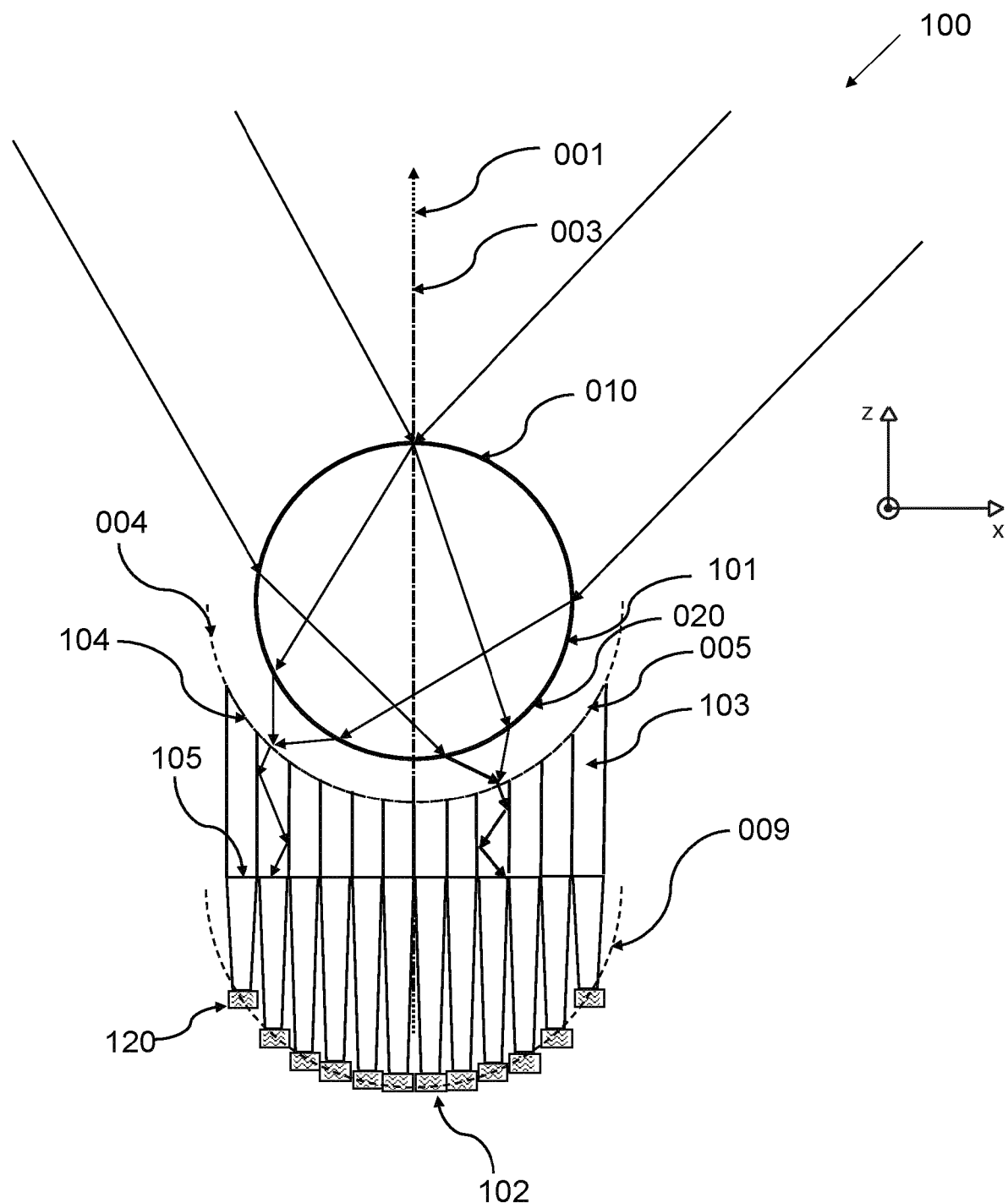
FIG. 10 shows an optical detector with photodetector segments arranged in the curved plane.

FIG. 10 shows an optical detector 100 with the plurality of photodetector segments 102 arranged in a curved plane 009. The curved plane 009 indicates the plurality of photodetector segments 102 being arranged on a flexible substrate, PCB, or foil. The curved plane 009 can be substantially parallel to the focal plane 004 as shown in FIG. 10. Alternatively, the curved plane 009 may have higher or lower curvature compared to focal plane 004.

Figure 11A:
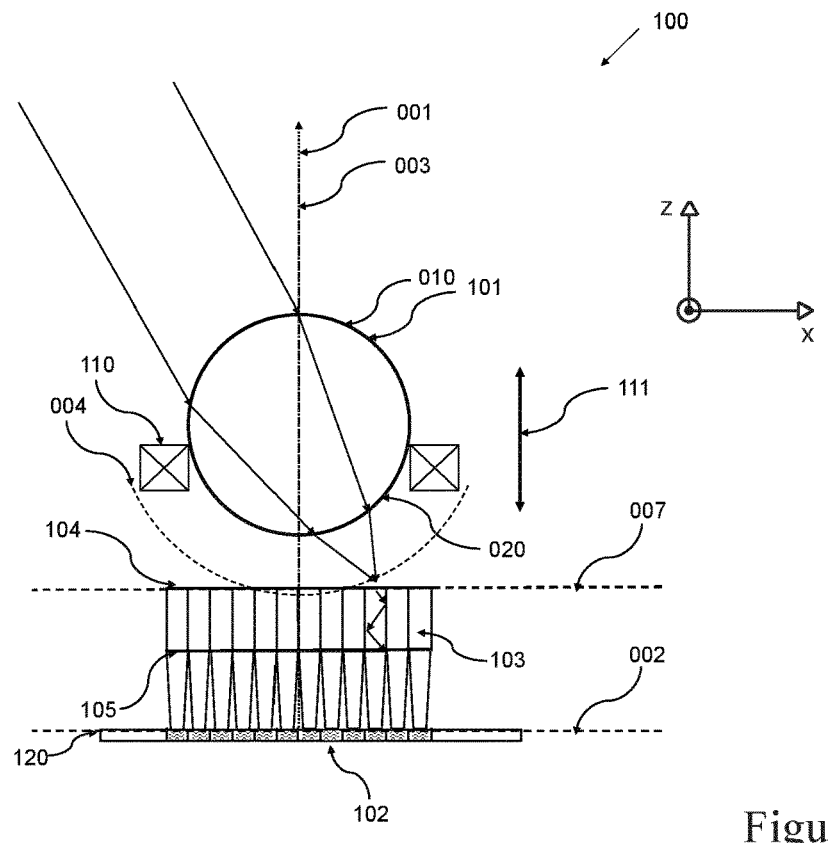
FIGS. 11(a) and (b) show an optical detector having a mechanical system for compensating the field curvature of the ball lens.
Figure 11B:
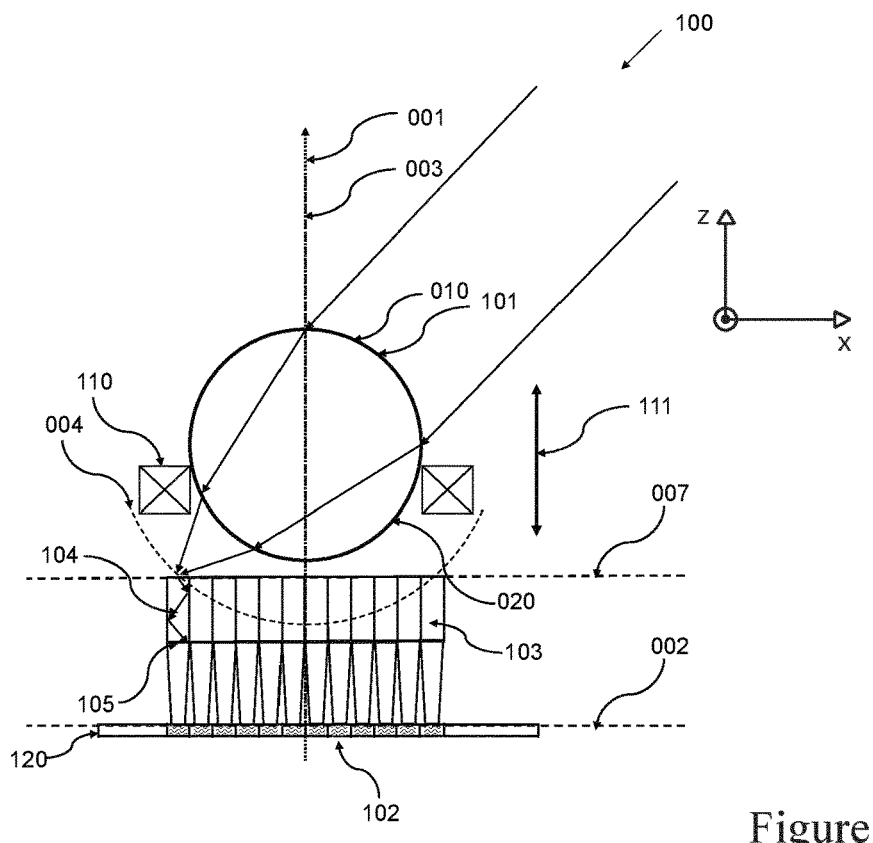

FIGS. 11(a) and (b) show a cross-sectional view of an optical detector 100 having a mechanical system configured to compensate for the field curvature of the ball lens 101 when the incoming light beam is originating from different angles of incidence. The optical detector 100 comprises an actuator 110 configured to move the ball lens 101 in a direction 111 parallel to the optical axis 001. The plurality of light entry surfaces 104 arranged together provides a flat surface 007 that is perpendicular to the center plane 003. From FIGS. 11(a) and (b), a single axis actuated movement may result in the sharpest image on the light entry surface 104 of a lightguide 103 for a given incidence angle, while the others may form above or below the flat surface 007. In that case, the image quality may not be sharp enough and therefore the intensity of the detector signal may be very weak. The actuation can be modestly small for realizing sufficient performance improvement. For example, if a ball lens having a radius of 3.4 mm and the difference in the focus plane between angles of incidence of 0° and 25° is about 0.75 mm. Therefore, only a small adjustment of the ball lens 101 position in the vertical direction with respect to the photodetector plane 001 can be sufficient to compensate for the field plane 004 curvature. Alternatively, the plurality of photodetector segment 102 with the plurality of lightguides 103 may be actuated with respect to the ball lens 101 in the direction 111 to achieve the same effect.

Figure 12:
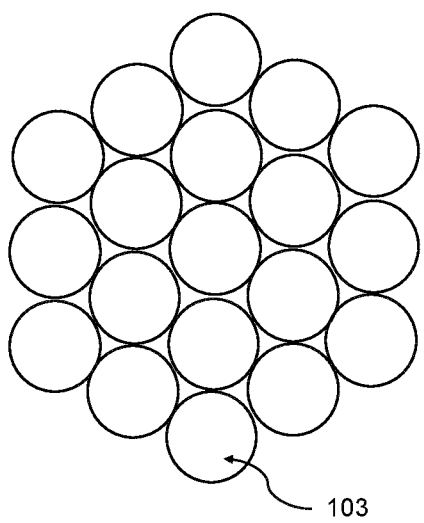
FIGS. 12(a) and (b) show possible arrangements for the plurality of lightguides.
Figure 12:
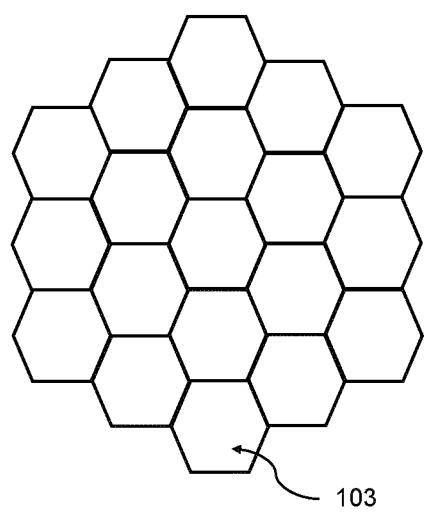

FIGS. 12(a) and (b) show possible arrangements for the plurality of lightguides 103. The plurality of lightguides 103 may be collectively arranged or bundled next to each other. In FIG. 12(a), each of the plurality of lightguides 103 has a circular cross-section and in FIG. 12(b), each of the plurality of lightguides 103 has a polygonal cross-sections, specifically hexagonal. And the plurality of lightguides 103 are arranged in a lightguide array. The cross-sections of the plurality of lightguides 103 may be applicable for the plurality of light entry surfaces 104 and/or the plurality of light exit surfaces 105.

The plurality of lightguide can be a simple set of lightguides mounted on a photodetector or an array of photodetector segments that have decreasing lengths from the edge of the photodetector or the array of photodetector segments towards the center axis of the ball. The light entry surfaces of the lightguides are close to the focal plane of the ball lens so that the light transmitted by the ball lens can be coupled into the lightguide. A specific implementation for the plurality of lightguides in a bundle can be found in the application of an imaging optical fiber bundle that may be processed as a monolithic building block and that can easily be mounted in the system, at the cost of some light loss due to the required claddings around the cores of the individual fibers. The lightguides may be based on optical fibers having core and cladding. Alternatively, the lightguides may have hollow cores with reflective inner surfaces.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain features are recited in mutually different dependent claims does not indicate that a combination of these features cannot be used to advantage. The various aspects discussed above may be combined in order to provide additional advantages. Further, the person skilled in the art will understand that two or more embodiments may be combined.

The invention claimed is:

1. An optical detector comprising:
  a ball lens comprising a first spherical surface configured to receive incoming light with an angle of incidence from 0 degrees to 25 degrees and a second spherical surface for exiting incoming light,
  a photodetector,
  a plurality of lightguides, and
  an actuator,
  wherein each of the plurality of lightguides has a light entry surface and a light exit surface, wherein the plurality of light entry surfaces are facing the second spherical surface of the ball lens and the plurality of light exit surfaces are facing the photodetector, wherein the photodetector and the plurality of lightguides are arranged around an optical axis of the ball lens, and the actuator is configured to move the photodetector in a direction parallel to the optical axis, and wherein the plurality of light entry surfaces arranged together provides a flat surface that is perpendicular to a center plane, the center plane is coinciding with the optical axis of the ball lens and each of the plurality of light entry surface at least partially coincides with a focal plane of the ball lens, the flat surface is arranged to intersect with the center plane at a first distance from an edge of the ball lens that intersects with the center plane, and the first distance being in a range between 50% to 80% of a back focal length of the ball lens.

2. The optical detector according to claim 1, wherein the photodetector and the plurality of lightguides are symmetrically arranged around the optical axis.

3. The optical detector according to claim 1, wherein each of the plurality of lightguides has a circular or a polygonal cross-section, and the plurality of lightguides are arranged in a lightguide array.

4. The optical detector according to claim 1, wherein the photodetector comprises a plurality of photodetector segments.

5. The optical detector according to claim 4, wherein the plurality of lightguides has a number of lightguides, wherein the plurality of photodetector segments has a number of photodetector segments that is the same as the number of lightguides.

6. The optical detector according to claim 4, wherein the plurality of photodetector segments are arranged in a photodetector plane that is perpendicular to the center plane.

7. The optical detector according to claim 4, wherein the plurality of photodetector segments are arranged in a curved plane.

8. The optical detector according to claim 4, wherein the optical detector comprises a plurality of light concentrators between the plurality of photodetector segments and the plurality of lightguides, and each of the plurality of light concentrators are in optical connection with one of the plurality of photodetector segments and the plurality of lightguides.

9. The optical detector according to claim 1, wherein the first distance is in a range between 60% to 68% of the back focal length.

10. The optical detector according to claim 1, wherein the actuator is further configured to move the ball lens in the direction parallel to the optical axis.

11. An optical communication device comprising the optical detector according to claim 1 and a digital communication interface device, wherein the optical detector is communicatively connected to the digital communication interface device.

12. An optical detector comprising:
a ball lens comprising a first spherical surface configured to receive incoming light with an angle of incidence greater than 20 degrees and less than or equal to 25 degrees and a second spherical surface for exiting incoming light,
a photodetector,
a plurality of lightguides, and
an actuator,
wherein each of the plurality of lightguides has a light entry surface and a light exit surface,
wherein the plurality of light entry surfaces are facing the second spherical surface of the ball lens and the plurality of light exit surfaces are facing the photodetector,
wherein the photodetector and the plurality of lightguides are arranged around an optical axis of the ball lens, and the actuator is configured to move the photodetector in a direction parallel to the optical axis, and
wherein the plurality of light entry surfaces arranged together provides a flat surface that is perpendicular to a center plane, the center plane is coinciding with the optical axis of the ball lens and each of the plurality of light entry surface at least partially coincides with a focal plane of the ball lens.

\* \* \* \* \*